United States Patent [19]
Wunderlich

[11] Patent Number: 5,662,856
[45] Date of Patent: Sep. 2, 1997

[54] LOW-PRESSURE METHOD FOR THE PREPARATION OF HOLLOW PLASTIC ARTICLES

[75] Inventor: Ernst Dieter Wunderlich, Warren, N.J.

[73] Assignee: Imesco, Inc., Warren, N.J.

[21] Appl. No.: 501,310

[22] Filed: Jul. 12, 1995

[51] Int. Cl.$^6$ ...................................... B29C 45/12
[52] U.S. Cl. ................... 264/297.2; 264/297.8; 264/328.7; 264/328.8; 264/328.12
[58] Field of Search .................... 264/297.2, 297.8, 264/328.7, 328.8, 328.12

[56] References Cited

U.S. PATENT DOCUMENTS

| | | | |
|---|---|---|---|
| 4,243,620 | 1/1981 | Curetti et al. | 264/45.1 |
| 4,324,541 | 4/1982 | Curetti et al. | 425/562 |
| 4,330,257 | 5/1982 | Rees et al. | 425/556 |
| 4,395,222 | 7/1983 | Gaiser et al. | 425/548 |
| 4,717,324 | 1/1988 | Schad et al. | 425/130 |
| 4,775,308 | 10/1988 | Schad et al. | 425/130 |
| 4,786,455 | 11/1988 | Krishnakumar et al. | 264/237 |
| 4,863,369 | 9/1989 | Schad et al. | 425/547 |
| 4,990,301 | 2/1991 | Krishnakumar et al. | 264/513 |

*Primary Examiner*—Leo B. Tentoni
*Attorney, Agent, or Firm*—Edward M. Fink

[57] ABSTRACT

Hollow plastic articles are produced by a method wherein molten material is first conveyed at low pressure via a telescoping nozzle, across compensating rods in the melt passages and individually circumferential flow passages of common primary distribution spools into transfer reservoirs. Upon completion of the controlled filling phase, primary and secondary distribution spools are shifted, the mold manifold assembly with the transfer housing together with the mold cavity bottoms and outside wall-forming sleeves are drawn in unison against stationary displacement plugs which transfer the molten material from the transfer reservoirs around the fixed-position core pin tips and into corresponding mold cavities. After completion of the cavity filling phase, the common secondary distribution spools, located close to the mold cavity bottom gates, are shifted laterally such that their land areas shut off the external melt streams. The manifold assembly, together with the now sealed cavity bottoms and outside wall-forming sleeves, move toward the fixed position core pins, whereby the molten material flowing in the same direction is condensed into the final shape of the hollow plastic article. Upon solidification, the mold is opened and the molded hollow articles are rotated or shuttled on the cooling core pins in a vertical or horizontal plane outside the molding machine clamp to subsequent cooling and ejection stations. During the hollow plastic article condensing phase, the primary distribution spools are shifted laterally again to open the passages from the plasticizer to refill simultaneously the individual transfer reservoirs with molten material.

20 Claims, 7 Drawing Sheets

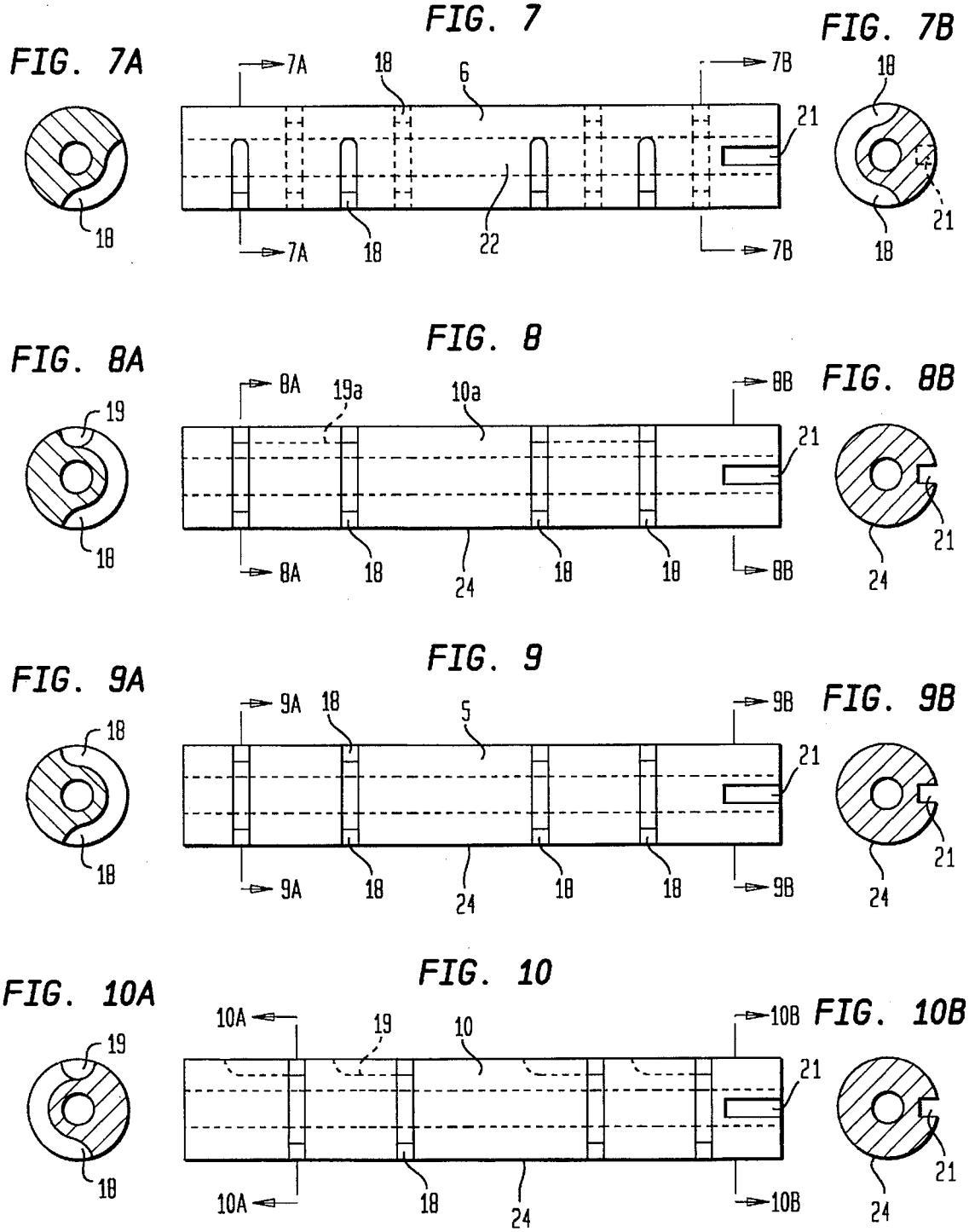

LOW-PRESSURE METHOD FOR THE PREPARATION OF HOLLOW PLASTIC ARTICLES

FIELD OF THE INVENTION

This invention relates to a method for the production of preforms and hollow articles. More particularly, the present invention relates to a method for the preparation at low pressure of hollow articles and preforms.

BACKGROUND OF THE INVENTION

Heretofore, in the operation of conventional molding machines, it has been common practice to inject molten material through the narrow passages of nozzles and mold cavities with core pins both in closed fixed positions. This procedure causes material stresses which necessitate the use of high clamping forces to prevent the molds from flashing and also requires considerable energy to generate the necessary processing injection pressures. The narrow nozzle passages are required to quickly separate the melt stream therein from the solidifying melt in the mold cavity so the hollow article can be released from the mold as early as possible. Workers in the art have further refined this technique by positioning individual shut-off nozzles in each mold cavity to shorten the time for the hot melt to solidify. However, the apertures of these shut-off nozzles are sufficiently restrictive to also require high injection pressure for filling the mold cavities. Unfortunately, the excessive frictional heat generated by these well-known techniques effects the melt quality and raises the melt temperature which in turn lengthens the cooling cycles.

U.S. Pat. Nos. 4,243,620 and 4,324,541, issued to Motosacoche, disclose a method and apparatus wherein large nozzle orifices are brought into registry with the bottom orifices of mold cavities. Core pins disposed in the apparatus are retractable during filling of the mold cavities. These features permit the filling of the cavities with molten material under low pressure at significant energy savings. Upon completion of the metering phase, the nozzles are shifted out of registry. The core pins or punches are then moved in the direction of the mold cavity bottoms or dies and compress the molten material into the final configuration of the desired hollow article or preform. Although this technique has proven to be useful, the drawback therein resides in the need for neck bushings with sufficient clearance to allow easy movement of the core pins. This clearance and the normal wear and tear of the bushings cause the core pins to deflect, thereby raising the risk of causing non-uniform side walls and defective sealing surfaces of the preforms or hollow articles. Due to the constant rubbing of the nozzle sealing surfaces against the mold cavity bottoms, the spring-loaded injection nozzle plates require frequent production interruptions, so necessitating the dismantling of the mold cavity blocks and the cleaning and lubricating of the moving contact surfaces.

U.S. Pat. Nos. 4,717,324, 4,775,308, 4,863,369 assigned to Husky, and 4,990,301 assigned to Continental PET Technologies disclose methods and related apparatus wherein each mold cavity has a single or multi-layer nozzle and a stationary hot runner system which meters one or several molten materials to the same nozzles via rotating spool valves and a plurality of manifold segments. The narrow nozzle passages require high pressures and, consequently, high clamping forces for the molten material to enter and pack out in the individual mold cavities to form the final product. The rotating spool valves of this type of apparatus can only open and close the passages for the molten material but cannot redirect the same to non-aligned exit ports. The shooting pots are built into the manifold segment and are individually monitored and post-adjusted. In the proposed invention, the opening and closing of the individual material passages is carried out through combined linear movements of common multi-passage distribution spools. In addition, these distribution spools can direct molten material not only from one but from several transfer reservoirs into one common mold cavity recipient via their circumferential and linear perpendicular radial passage channels. While the high pressure shooting pots in the aforementioned patents form directly a finished article, the unison movements of the transfer housings in the manifold assembly away and towards stationary displacement plugs serve to fill the transfer reservoirs with molten material, to convey the same at high velocity into the expanded mold cavities and, subsequently, condense the same molten material around fixed-position core pins into finished hollow articles. While the shooting pots in the aforementioned patents are directly post-adjusted for any volume correction, in the proposed invention compensation rods, located in the melt passages leading to the transfer reservoirs, preadjust indirectly the molten material volume prior to entering the same.

U.S. Pat. Nos. 4,330,257 to Husky and 4,786,455 to Continental Group disclose a method and an apparatus wherein square-shaped turrets rotate in 90 degree intervals within the machine platens of injection molding machines to form, cool and extract hollow articles and preforms. The drawback of this method and apparatus is that it is required to function within four stages which does not always permit the most optimum processing cycle.

U.S. Pat. No. 4,395,222 assigned to the Broadway Companies discloses a method wherein a molten material is conveyed from a central inlet sprue with a plurality of central runners located in a spiral configuration on the periphery of fixed-position bushings to a plurality of outlet gates. These same outlet gates intersect again with a second set of bushings with a plurality of central runners leading to the outlet gates connected with the mold cavity bottoms. These fixed-position bushings are heated internally, a procedure which is well known in the art. Although the runners in the primary and secondary cylinders are of a balanced arrangement, high injection pressures and, consequently, higher machine clamping forces are required to convey the molten material from one central inlet sprue through intersecting runners to the closed mold cavities.

An object of the present invention was to eliminate such limitations by positioning primary and secondary distribution spools in a cascading manner within the manifold, so permitting them to function like multi-stage hydraulic solenoid valves to direct, redirect, combine, or block the flow of molten material or materials simultaneously from the continuous extruding plasticizer to the plurality of transfer reservoirs or housings and from there to the plurality of mold cavities. In this arrangement, the runners are reduced to a minimum length, so permitting conveyance of the molten material at low pressures to the individual mold cavities and the total elimination of cavity nozzles.

It is a further object of the present invention to replace individual rotating spool valves, pin-type shut-off nozzles and straight-through mold cavity nozzles with common distribution spools which are shifted laterally to open, close, or redirect, via the circumferential flow passages, the molten material from the plasticizing unit into mold cavities via transfer reservoirs. It is still another object of the present invention to release the hollow articles or preforms by indexing or shuttling the core pins in a horizontal or vertical plane outside the mold clamps of the molding machines, to reduce the cycle times by holding the hollow articles or preforms longer in imminent contact with the cooling core pins, compared to systems in which robots reach in and out between the open mold halves to collect preforms in tubular cooling sleeves and by choosing the optimum number of intermittent cooling stations.

Although the foregoing compression, injection, co-injection molding and cooling methods and apparatuses have proven successful, the proposed technique results in enhancing the wall concentricity of the hollow articles and preforms, reducing the maintenance and downtimes by eliminating the cavity nozzles, increasing the production flexibility with directional distribution spools which cannot only open and close the melt passages but also redirect the molten material within the same manifold block to different center distances through lateral movements, where articles and preforms can be transferred on rotating or shuttling tables within a multitude of stations according to the different processing conditions.

SUMMARY OF THE INVENTION

In accordance with the present invention, a low pressure, hollow article forming method and apparatus is described which utilizes a universal manifold system having a maximum number of transfer reservoirs regardless of the number and center distances of the individual mold cavities by directing or blocking the molten material flow to the same cavities with laterally shifting directional distribution spools.

By changing distribution spools with different circumferential melt passage geometries, the operator can mount a number of smaller mold cavities equal to the maximum number of transfer reservoirs to form hollow articles or can mount a fewer number of larger cavities onto the same manifold space available.

Instead of keeping the transfer reservoirs bottomed out as outlined in the prior art Husky patent to create a second melt passage or packing and holding phase, the land area of the shifted distribution spools blocks the melt backflow. This permits the recharging of the transfer reservoirs immediately after discharging, independent from the simultaneously occurring condensing phase.

The manifold system with its series of independently shifting distribution spools offers the possibility of forming heavy wall hollow articles or preforms exceeding the capacity of one single transfer reservoir by conveying molten material either from a multiple number of transfer reservoirs into one or a multitude of mold cavities via a common distribution spool.

In accordance with the inventive technique, molten material is conveyed from a plasticizer via a telescoping nozzle across a hot runner across compensation rods into the transfer reservoirs via the open circumferential melt passages of primary directional distribution spools located within the preform mold manifold or manifold assembly. Upon shifting of the primary distribution spools, the preform mold manifold with the built-in transfer housings is drawn over heated stationary displacement plugs and the mold cavity bottoms, together with the outside wall forming sleeves, move away from the fixed position core pins. Simultaneously, the molten material is displaced from the transfer reservoirs via the circumferential melt passages of the primary and secondary distribution spools into the mold cavities at high velocity. Instantly, upon completion of the molten material transfer phase, the secondary distribution spools are shifted to close off their circumferential melt passages from the gates in the mold cavity bottoms and the preform mold manifold, together with the mold cavity bottoms and outside wall-forming sleeves, move toward the fixed position core pins to condense the molten material into the final configuration of the preforms or hollow articles. At the same time, the transfer reservoirs are being recharged with molten material. The steps required to form, cool, and release the preforms are continuously carried out by use of an intermittently rotating or shuttling transfer table, wherein the same preforms are transferred outside the machine clamp area by a plurality of core pins for further cooling, coating, or blowing of a finished hollow article, or are extracted for storage and future use.

BRIEF DESCRIPTION OF THE DRAWING

The invention will be more readily understood by reference to the following drawing wherein:

FIG. 7 illustrates a sectional view of a first embodiment of primary distribution spools located in the mold manifold of the molding machine shown in FIG. 2 to convey molten material from a plasticizer via a telescoping nozzle into transfer reservoirs or, when shifted laterally, from the transfer reservoirs into mold cavities via secondary distribution spools;

FIG. 8 illustrates secondary distribution spools to combine molten material from a multitude of transfer reservoirs into a lesser number of mold cavities;

FIG. 9 illustrates a secondary distribution spool located in the mold manifold of a molding machine to convey molten material from transfer reservoirs to a first row of mold cavities, wherein flow channels, inlet ports, and exit ports are in-line with the inlet gate of the mold cavities; and FIG. 10 illustrates a secondary distribution spool located in the preform mold manifold of a horizontal or vertical clamp molding machine to convey molten material from transfer reservoirs to a second row off-line located mold cavities.

DETAILED DESCRIPTION OF THE INVENTION

Figure 1:
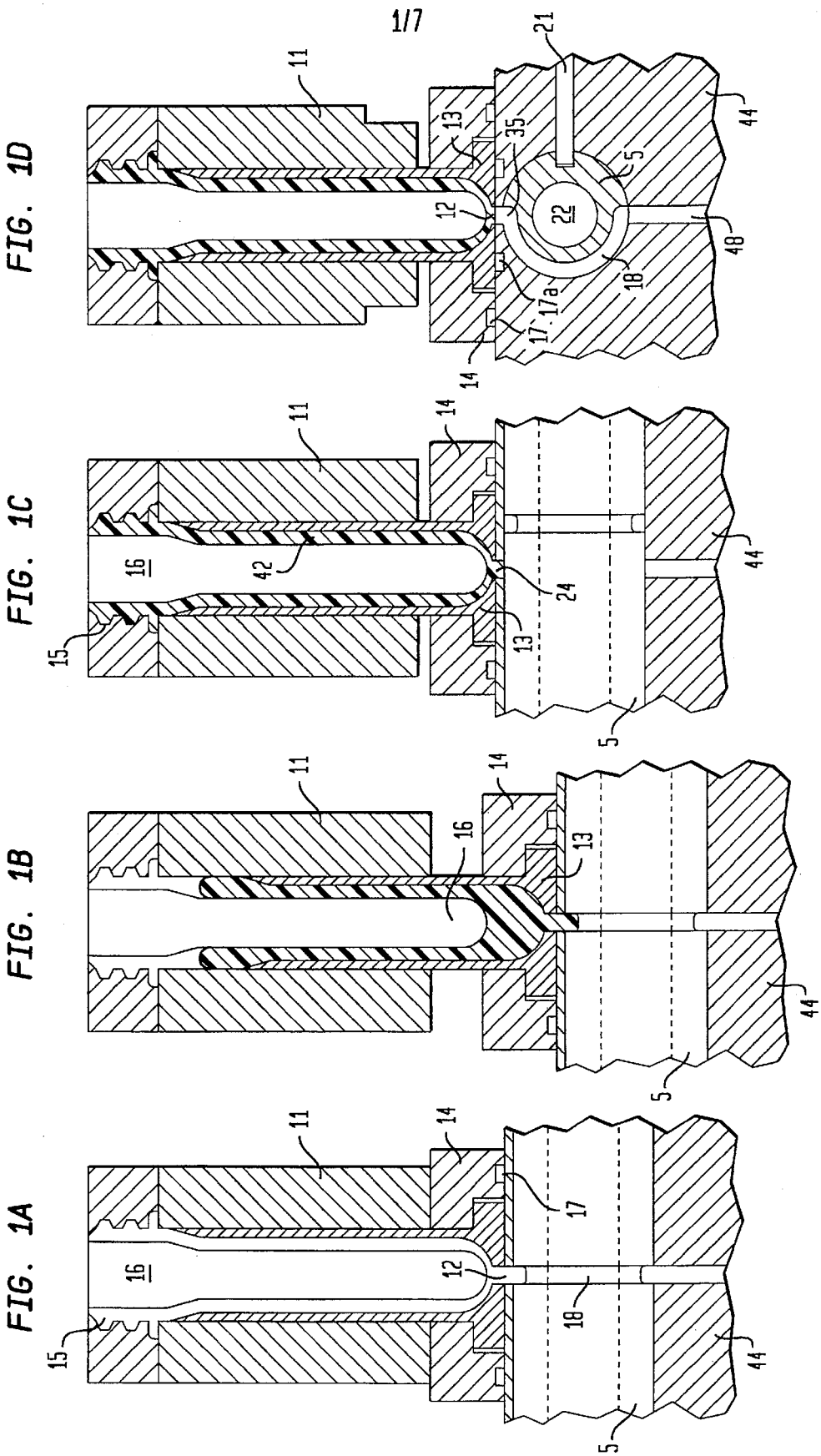
FIG. 1a is a sectional view of a preform mold assembly in a first operating position.
FIG. 1b is a sectional view of a preform mold cavity assembly of the type shown in FIG. 1a in a second operating position.
FIG. 1c is a sectional view of a preform molding cavity body assembly of the type shown in FIG. 1b in a third operating position.
FIG. 1d is a side view of the preform molding body assembly shown in FIG. 1c.

In the operation of the described apparatus, the movable molding machine clamp with the transfer/condensing cylinder in its extended position closes the mold, and the core pin holders, core pin stripper plates, neck rings, and mold bodies are locked concentrically in place by commercially available latch and cam plates and leader pins.

Molten material, generated by a plasticizing unit, is then transferred into transfer reservoirs via a telescoping nozzle compensation rods and the circumferential melt passages of common primary distribution spools into individual transfer reservoirs. The mold cavity bottoms with the continuously open transfer gate in the center together with the outside-wall-forming sleeves slide in a longitudinal direction within the mold cavity bodies toward and close to the fixed-position core pins. The circumferential passages of the secondary distribution spools located in the manifold assembly are then shifted laterally to align with the cavity bottom orifices. At this juncture, the primary distribution spools have been shifted to open passages so the molten material can begin to be transferred from the individual metering reservoirs into the mold cavities around the corresponding core pin tips. The mold cavity bottoms, together with the outside-wall-forming sleeves, continue to retract through a proportional control movement of the transfer cylinder. The molten material continues to be transferred from the transfer reservoirs at low pressure freely into the mold cavities and around the lower longitudinal axis of the core pins as the built-in transfer reservoirs approach the stationary displacement plugs.

The moment the preprogrammed volume of molten material has been transferred into the mold cavity, the internally heated secondary distribution spools, located in the manifold body, are shifted such that their land areas shut off the cavity bottom gates. The manifold assembly, together with the now closed mold cavity bottoms and outside wall-forming sleeves, is advanced by the programmable transfer cylinder toward the fixed-position core pins to condense the molten material uniformly within the mold cavities and to hold the same molten material under pressure until the shrinkage phase has been completed and the hollow articles or preforms are solidified enough to ascertain their final accurate dimensions. The benefit to this method is that the core pins are held in a rigidly fixed position. The core pins do not deflect from their concentric position when the molten material flows along their longitudinal axis uniformly in the same direction which is along the outside wall-forming sleeves. Upon sufficient solidification of the hollow article, the molding machine clamp opens. The latch and pull system disengages, so instantly permitting the spring-assisted neck rings, not shown, to spread open via angle pins. The mold continues to open, freeing the hollow articles or preforms held on the core pins.

Depending on the type of molding machine, the core pins rotate in a vertical plane when processing in a horizontal clamp machine and rotate in a horizontal plane when the process is effected in a vertical clamp machine. Alternatively, the core pins can be shifted laterally in either machine configuration. During these movements, the cooling of the hollow articles or preforms continues. After passing one or a plurality of cooling stations, the ejector mechanism activates the stripper plates to release the cooled preforms from the cooling core pins into a take-off device or secondary blowing unit.

Simultaneously, an empty set of core pins enters the molding station and a new cycle begins. Simultaneously, during the molten material-condensing phase, the transfer reservoirs of the manifold assembly are refilled with molten material for the next cycle. The transfer of molten material from the plasticizing unit into the transfer reservoirs of the preform mold manifold occurs through a central telescoping nozzle.

The internally heated distribution spools ascertain consistent melt flow while their colder outside surface acts as an insulation and does not affect the cooling process in the mold cavity.

The lateral shifting of the secondary distribution spools, located close to the cold mold cavity bottoms prevents the crystallization of certain materials such as polyester because the outside surface of the melt passage is maintained against the cold surface of the mold bottom during the condensing and cooling phase.

The exit ports of the secondary distribution spools are smaller in diameter than the entrance ports of the mold cavity bottoms to ascertain a streamlined flow of the molten material into the mold cavities. The stationary displacement plugs are of sufficient diameter to intensify the velocity of the molten material during transfer to prevent any characteristic changes.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE DRAWING

FIGS. 1a to 1c illustrate the sequential stages of the low-pressure hollow article method and apparatus described herein. Shown is the mold cavity in closed position, whereby the top surface of the cavity bottom and the outside wall-forming, sleeve-holding plate 14 bottoms out against the mold cavity assembly 11 and neck ring 15 to close preform mold cavity assembly 11. The bottom side of the mold cavity bottom holding plate 14 shows thermo-insulating air gaps 17 to minimize a melt temperature change between the cold mold cavity assembly 11 and the hot manifold assembly 44. The circumferential runner passage 18 of the internally heated distribution spool 5 is lined up with the orifice of the mold cavity bottom 12 to allow the molten material to be metered into the mold cavity 11.

FIG. 1b illustrates the hot manifold assembly descending together with the secondary distribution spool 5, mold cavity bottom and outside-wall-forming sleeve 13, being pulled by forming sleeve holder or holding plate 14, thereby widening the gap between the same and the tip of the core pin 16 such that a predetermined amount of molten material can continuously be metered into the mold cavity assembly 11 at low pressures.

FIG. 1c illustrates the secondary distribution spool 5 shifted laterally in the hot manifold assembly 44. Its land area 24 prevents a backflow of the molten material in the mold cavity assembly 11 when the manifold assembly 44 together with the outside wall-forming sleeve holder 14 moves the mold cavity bottom and outside wall-forming sleeves 13 toward the fixed position core pin 16 to condense the molten material in the mold cavity assembly 11 and neck ring 15 into the final hollow article or preform configuration 42. Cooling water circulating through surrounding cooling channels in the mold cavity body assembly and core pin, not shown, solidify the molten material to allow extraction of the finished article without deformation.

FIG. 1d shows the entry port of the individual melt passage 48, the circumferential runner 18 within the distribution spool 5, and the direct exit port of the same runner in line with the entry port 35 of the mold cavity bottom 12. A locating pin 21, press-fitted into the opposite side away from any runner, slides in a perpendicular milled-out channel of the distribution spool to prevent any rotating of the distribution spool 5. A cartridge heater is located in the center hole 22 of the distribution spool 5 to maintain the temperature of the molten material. The circumferential runner 18 in the secondary distribution spool 5, whereby its exit port 35 lines up with the gate 12 of the mold cavity bottom with its outside-wall-forming sleeve 13. Longitudinal air gaps 17 and 17a in the bottom surface of the outside-wall-forming sleeve holder 14 and in the top surface of the mold cavity manifold 44 thermo-isolate the molten material in the hot preform mold cavity manifold 44 from the cold mold cavity assembly 11.

Figure 2:
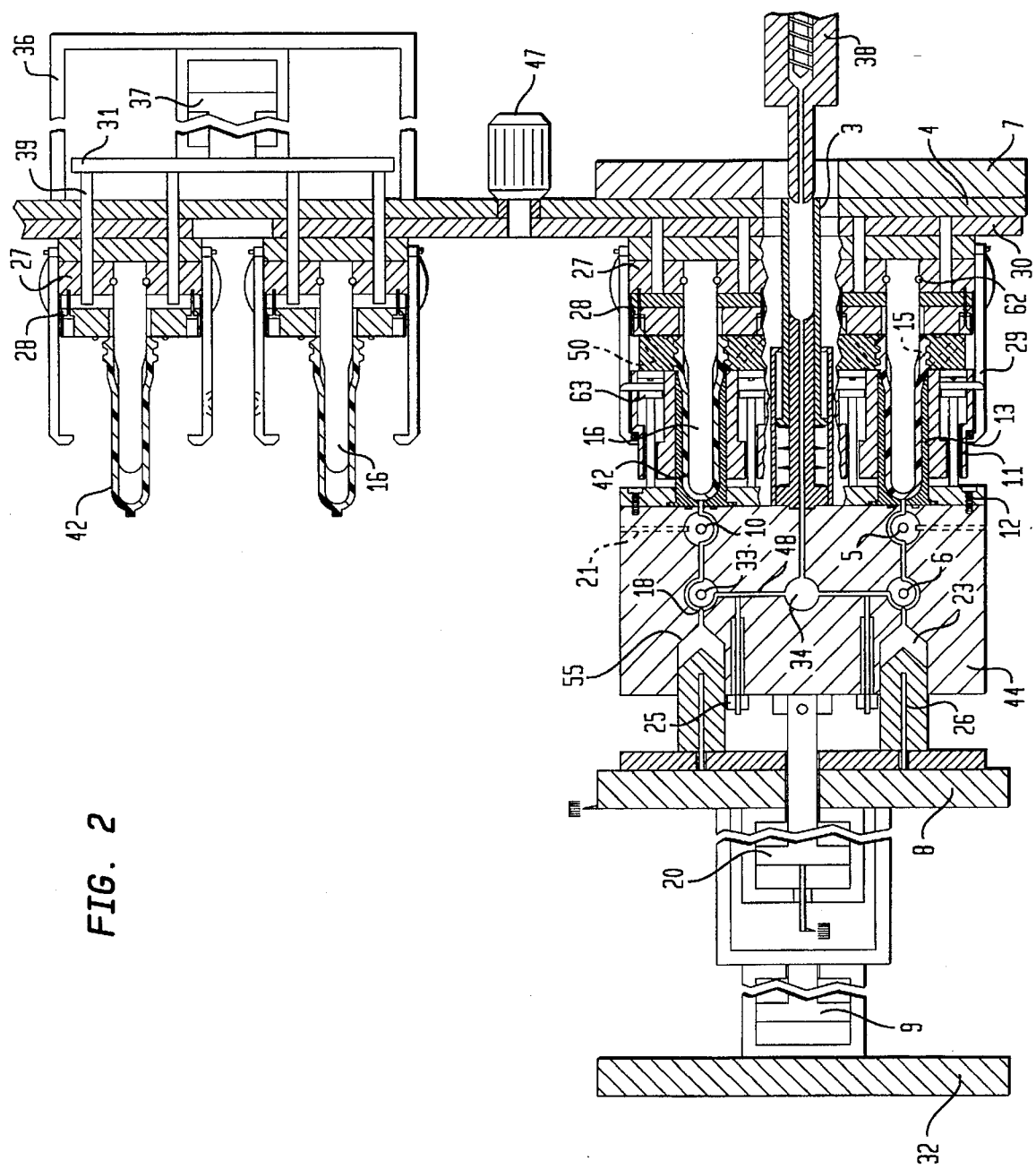
FIG. 2 is a top view in cross-section of a manifold and mold cavity assembly in a molding machine with a vertical rotary transfer table.

FIG. 2 shows the top view of the hollow article forming method in a molding machine. The movable clamp 8 with the clamp cylinder 9 mounted onto the fixed base platen 32 advances the preform mold manifold 44 into position. The programmable transfer cylinder 20 extends the transfer housings 55 built into the preform mold manifold assembly 44 away from the stationary displacement plugs 26 and closes the mold cavity assembly 11. A latch and cam plate mechanism 29 fastens the mold cavity assembly 11, neck ring 15 and stripper plate 28 to the core pin holder assembly 27 and the telescoping nozzle 3 is compressed against the plasticizer nozzle 38.

Molten material is then conveyed from the plasticizer 38 through telescoping nozzle 3, via the main hot runner 34 over the expandable flow compensation rods 25 across the circumferential passages 18 of the primary distribution spools 6 and 33 into the transfer reservoirs 23.

Upon completion of the molten material filling phase, the primary distribution spools 6 and 33 are shifted to close off the melt passages 48 coming from the hot runner 34 and open the melt passages leading to the secondary distribution spools 5 and 10.

The axial circumferential melt passages 18 of the secondary distribution spool 5 and the axial as well as perpendicular grooved melt passages 18 and 19 of the secondary distribution spool 10 are opened toward gates 12 of the mold cavity bottoms and outside wall forming sleeves 13 located within the mold cavity assembly 11.

The transfer cylinder 20 draws the transfer housings 55 in unison against the heated large diameter stationary distribution plugs 26. The molten material flows from the transfer reservoirs 23 at high velocity into the mold cavity assemblies 11 and around the tips of the core pins 16. Simultaneously, the mold cavity bottoms with the outside wall forming sleeves 13 move away from the core pins 16 to enlarge the cross-sectional areas within the mold cavity assemblies 11 for the molten material to continue to flow at low pressure.

Once the desired volume of molten material has been transferred into the mold cavity assemblies 11, the secondary distribution spools 5 and 10 are shifted laterally so their respective land areas 24 seal off the cavity bottom orifices 12 of the preform mold cavity assemblies 11.

At the same time, the primary distribution spools 6 and 33 are shifted again to reopen the molten material passages 48 from the plasticizer 38 to the transfer reservoirs 23.

While the transfer cylinder 20 moves the mold manifold 44 together with the mold cavity bottom and outside wall-forming sleeves 13 to condense the molten material in the mold cavity assembly 11 to form the final hollow article or preform 42 new amounts of molten material are metered into the transfer reservoirs 23 in preparation for the next forming cycle.

Upon completion of the condensing phase, wherein the finished hollow article 42 is sufficiently cooled to maintain its close tolerance configurations, the molding machine clamp 8 with the clamp cylinder 9, mounted on the fixed base molding machine platen 32 retracts the preform mold cavity assembly 11 away from the fixed clamp platen 7. This movement unlocks the latch and cam plate mechanism 29. Shoulder bolts 63 pull the mold body assembly 11 away from the fixed-position core pins 16 far enough to allow the same core pins 16 to rotate on the rotary transfer table 30 together with the hollow article 42 by means of an indexing motor 47 mounted on the transfer base plate 4 to a subsequent cooling station (not shown) and ejection station 36. At the same time, angle pins 50 spread the neck rings 15 mounted onto the mold cavity assembly 11 to allow release of the finished hollow article 42.

Figure 2A:
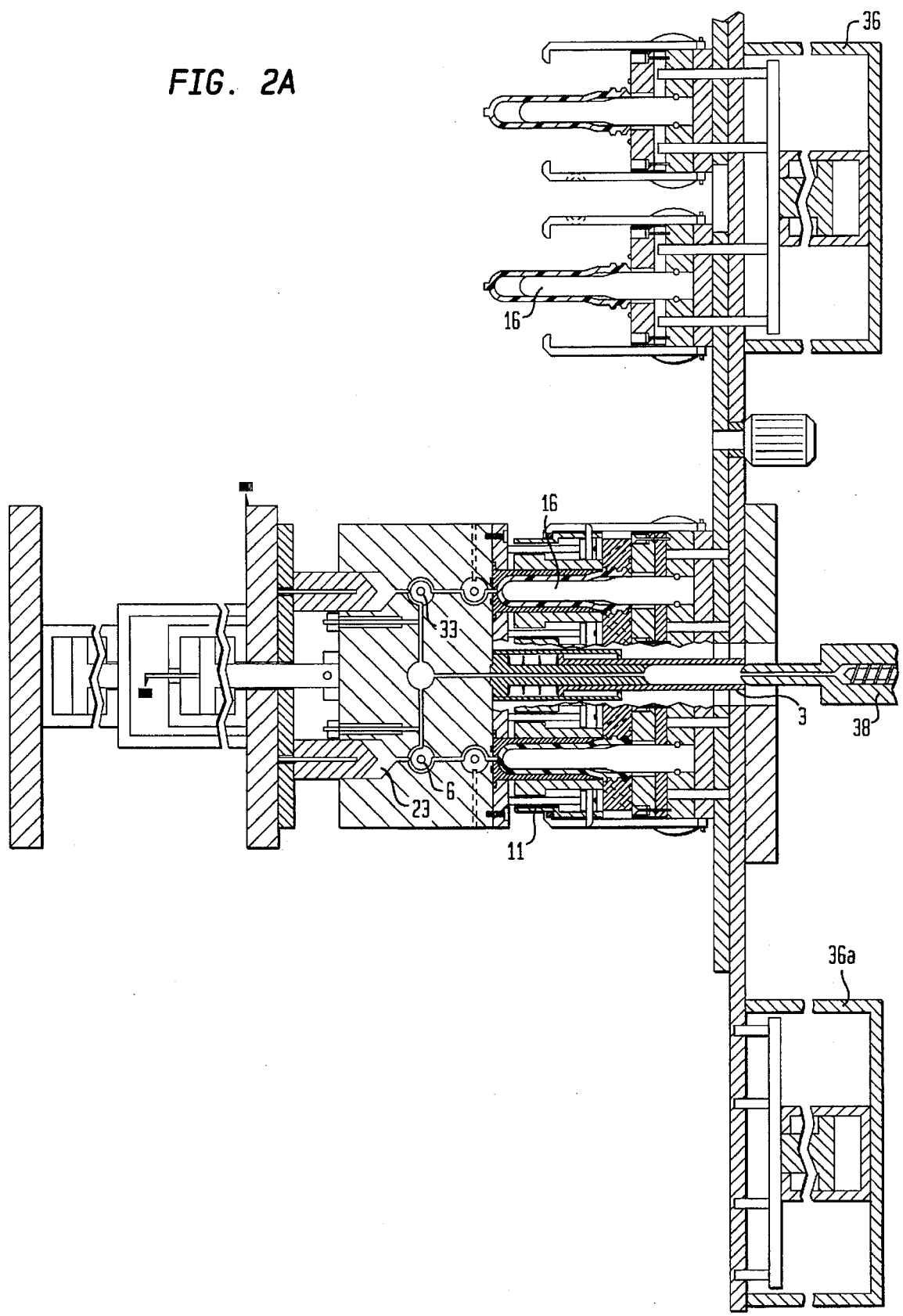
FIG. 2a is a top view in cross-section of a manifold assembly with a shuttle transfer table.

In the ejection station 36, the ejector piston 37 activates the ejector assembly 31 in which the ejector rods 39 push across the core pin holders 27 the stripper plates 28 which in turn extract the now solidified finished hollow articles 42. FIG. 2a shows the same top view of the hollow article forming apparatus for a molding machine. However, the core pins 16 shuttle alternatively back and forth between the preform mold cavity assembly 11 and the adjacent ejector stations 36 and 36a on a shuttle table 40. The molten material is being injected by the plasticizer 38 across a central telescoping injection nozzle 3 into metering reservoirs 23 via intermittent distribution spools 6 and 33.

Figure 3:
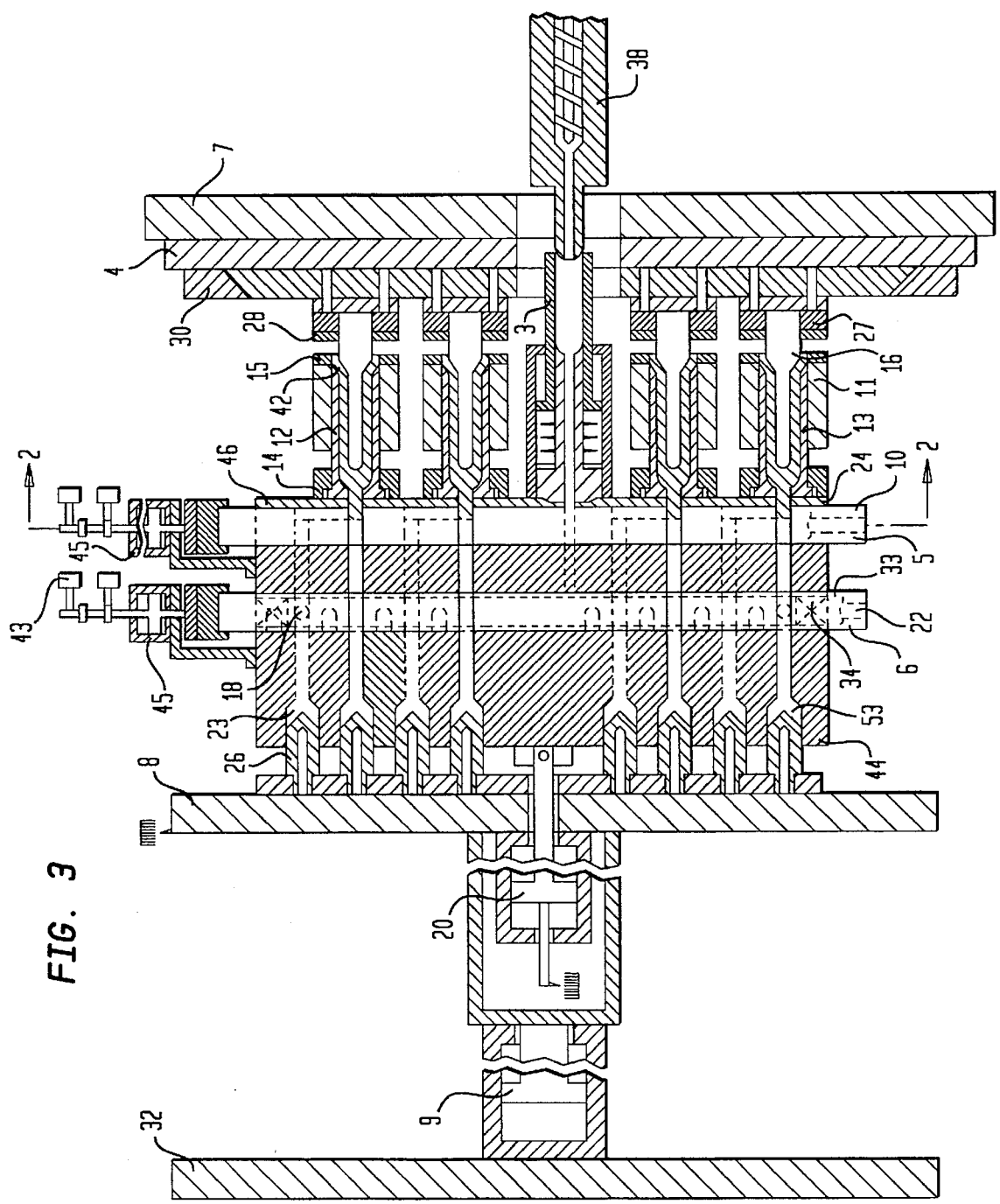
FIG. 3 illustrates a sectional side view of a manifold and mold cavity assembly in a molding machine for production of hollow articles.

FIG. 3 shows a side view of the manifold assembly 44 in a molding machine with individual transfer reservoirs 23 and mold body assembly 11 with neck rings 15 and the outside wall forming sleeves 13 and forming sleeve holders 14 mounted on the movable clamp platen 8 and core pins 16 in the core-pin-holder assembly 27 and stripper plates 28 mounted on a rotating or shuttle transfer table 30 and transfer base plate 4, attached to fixed clamp platen 7. The clamp cylinder 9 resting against the fixed base plate 32 of the molding machine moves the preform mold cavity body assembly 11 into position. The transfer cylinder 20 then advances to close the mold cavity assembly 11 and brings the preform mold manifold assembly 44 with the transfer housings 55 into an extended position in relation to the fixed position displacement plugs 26 to convey molten material from the plasticizer 38 via the telescoping nozzle 3 through the main hot runner 34 across heated compensation rods, not shown, and individual radial flow passages 18 of the two primary distribution spools 6 and 33 into the corresponding transfer reservoirs 23. Once the molten material transfer phase is completed, the primary distribution spools 6 and 33 are shifted laterally by an electro-hydraulic or pneumatic cylinder assembly 45 equipped with electric proximity switches 43 limiting the strokes to close the passages from the central hot runner manifold 34 and open the passages towards the secondary distribution spools 5 and 10. All distribution spools are internally heated by built-in heating elements, for example electric cartridge heaters 22. The secondary distribution spools 5 and 10 are located close to the manifold surface 46 to eliminate the requirements of nozzles between the manifold assembly 44 and the preform cavity bottom orifice 12. The secondary distribution spools 5 and 10 are equipped with an electro-hydraulic or pneumatic shifting system or cylinder assembly 45 to either allow passages of molten material into each individual preform mold cavity assembly 11 or blockage of the melt stream with the land areas 24 of the same distribution spools 5 and 10 to allow for the condensing phase to form the finished hollow article 42.

Figure 4:
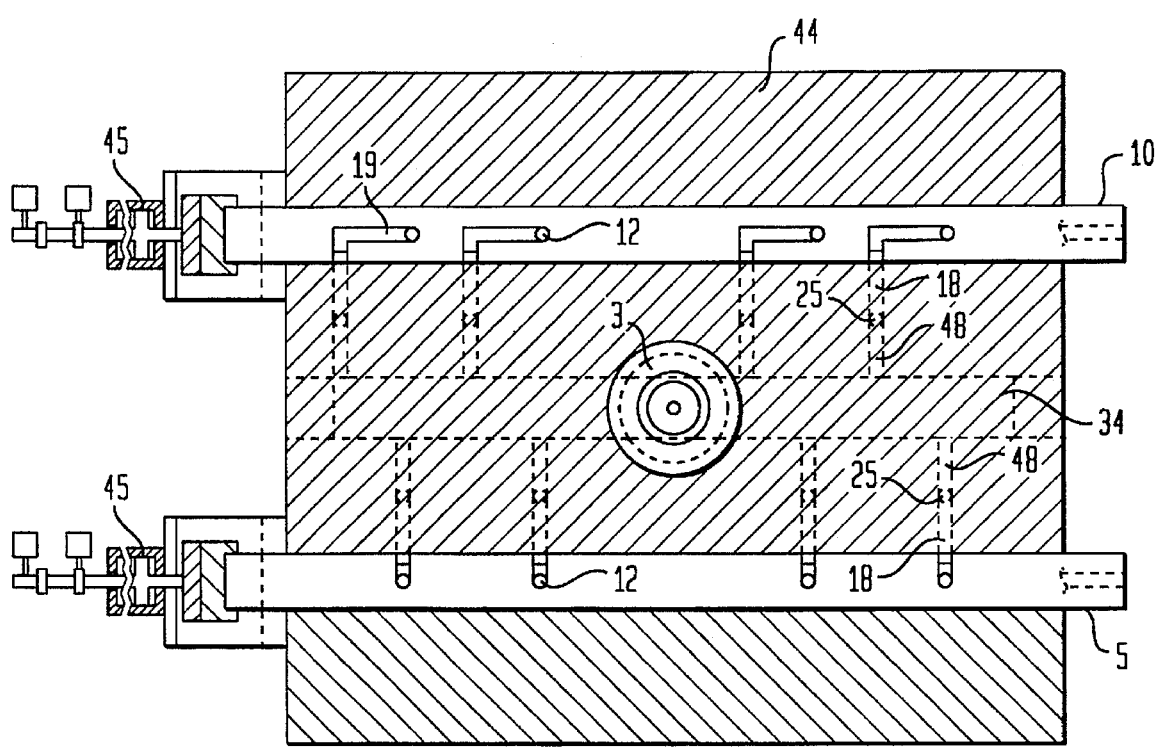
FIG. 4 illustrates a cross-sectional top view of the manifold assembly shown in FIG. 3 along section line 2—2.

FIG. 4 shows a cross-sectional top view of the manifold assembly 44 with a central telescoping nozzle 3, main hot runner 34, melt passages 48 interrupted by flow compensation rods 25 allowing to convey molten material during the preform condensing phase through the same hot runner 34 into the primary distribution spools 6 and 33, not shown, into the transfer reservoirs 23. The secondary distribution spool 5 shows individual circumferential runners 18, whose entrance ports line up with the melt passages coming from the metering reservoirs, not shown, and the mold cavity bottoms gates 12. The secondary distribution spool 10 shows individual circumferential runners 18, whose entrance ports line up with the melt passages coming from the metering reservoirs 23, not shown, and the exit ports are located off-line 19 to meet the gates of the mold cavity bottoms 12. All distribution spools are shifted by the cylinder assemblies 45 to open and close the individual melt passages 18 and 19.

Figure 5:
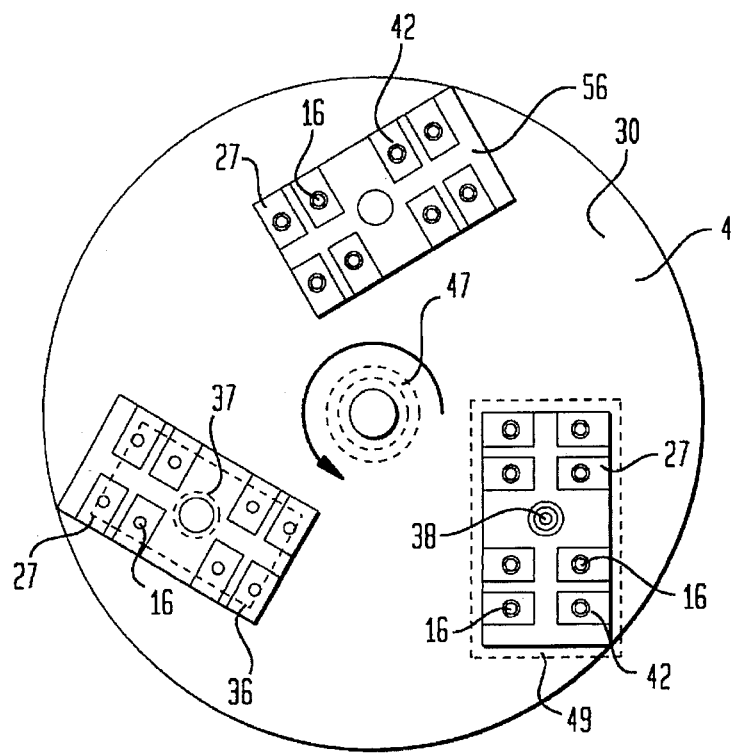
FIG. 5 illustrates a front view of the vertical rotary transfer table of the horizontal clamp molding machine shown in FIG. 2.

FIG. 5 shows a front view of a vertical multi-station rotary transfer table 30 mounted onto a fixed transfer base plate 4 with individual core pin holders 27 and core pins 16 and finished hollow articles or preforms 42 constituting the hollow article forming station 49, where molten material is metered in from the plasticizer 38, the intermittent cooling station 56, where the hollow articles or preforms 42 continue to cool on the core pins 16, and the hollow article ejection station 36 with the ejection piston 37 beneath which are rotated by means of an indexing drive 47.

Figure 6:
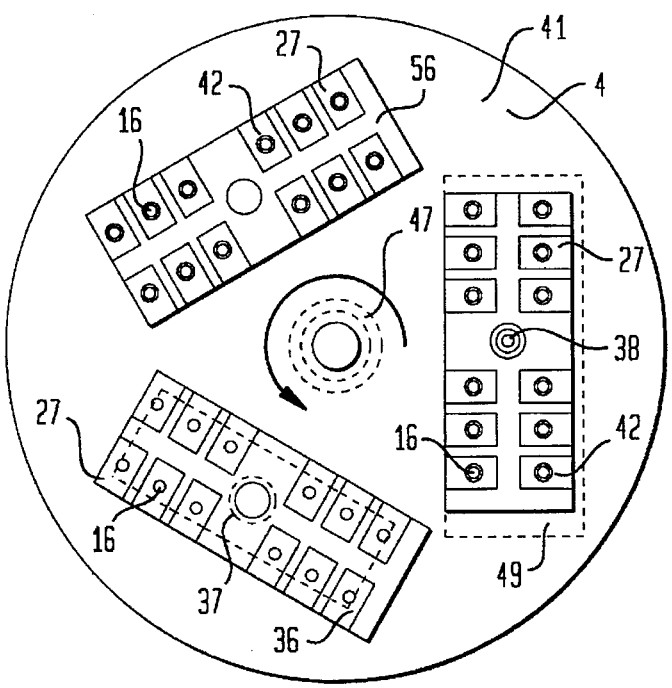
FIG. 6 illustrates a bottom view of a vertical rotary transfer table in a vertical clamp molding machine.

FIG. 6 illustrates a bottom view of a horizontal multi-station rotary transfer table 41 mounted onto a fixed transfer base plate 4 with individual core pin holders 27 and core pins 16 and finished hollow articles or preforms 42 constituting the hollow article forming station 49 where molten material is metered in from the plasticizer 38, the intermittent cooling station 56, where the hollow articles or preforms 42 continue to cool on core pins 16, and the hollow article ejection station 36 with the ejector piston 37 beneath, which are rotated by means of an indexing drive 47.

FIG. 7 shows the primary distribution spool 6 and the mirror image 33 for a plasticizing manifold assembly of a molding machine, illustrated in FIGS. 2 and 2a, which allows to convey molten material either from a plasticizing unit to transfer reservoirs or, when shifted laterally, from the same transfer reservoirs to mold cavities by passing along individual circumferential flow passages 18. The respective flow passages are aligned with the corresponding melt passages 48 in the manifold assembly by shifting the distribution spools 6 and 33 laterally with the help of a hydraulic piston assembly 45. The center of the distribution spool 6 and 33 are bored out to introduce a heating rod into the same bore 22.

FIG. 7a shows the side view of distribution spool 6 whereby the circumferential flow passage 18 aligns with the melt passage 48 coming from hot runners 34 and leading toward the transfer reservoir 23.

FIG. 7b shows the side view of distribution spool 6 whereby the circumferential flow passage 18 aligns with the melt passage coming from the transfer reservoir 23 and exiting toward the melt passage 48 leading to a secondary distribution spool, not shown.

FIG. 8 shows a secondary distribution spool 10a for a plasticizing manifold assembly of a molding machine illustrated in FIGS. 2 and 2a to convey molten material from a multitude of transfer reservoirs into a lesser number of mold cavity assemblies via several circumferential flow passages 18 grooved in an axial direction 19a, combining the melt flows to meet a common gate, not shown, in the preform mold cavity assembly.

FIG. 8a shows the side view of the distribution spool 10a whereby the axial circumferential passage 18 intersects with perpendicular grooved melt passages 19a.

FIG. 8b shows the side view of the distribution spool 10a with its land area 24 to seal off the molten material in the mold cavity and the key way 21 for a locating pin to prevent the distribution spool from rotating.

FIG. 9 shows a secondary distribution spool 5 located in the preform mold manifold of a molding machine as described in FIGS. 2 and 2a to convey molten material from the transfer reservoirs into the mold cavity assemblies via individual circumferential melt passages 18 into in-line mold cavity assemblies. Upon lateral shifting of the distribution spool 5, being located close to the manifold surface, its land area 24 seals off the molten material in the mold cavity assembly so the molten material condensing process can begin.

FIG. 9a shows a side view of the distribution spool 5 in which the axial circumferential melt passages 18 direct the flow of molten material from the transfer reservoirs to in-line mold cavity assemblies not shown.

FIG. 9b shows a side view of the distribution spool 5 with its land area 24 to seal off the molten material and locating key way 21 to prevent the distribution spool from rotating.

FIG. 10 shows a secondary distribution spool 10 in a preform mold manifold of a molding machine, as illustrated in FIGS. 2 and 2a for an off-center row of mold cavity assemblies. The Individual circumferential flow passages 18 are grooved in an axial direction and in perpendicular direction 19 to meet the gates 12, not shown, of the preform mold cavity assembly 11 located in an off-center position.

FIG. 10a shows the side view of the distribution spool 10 with an in-line circumferential flow passage 18 leading into a perpendicular circumferential passage 19.

FIG. 10b shows the side view of the distribution spool 10 with its land area 24 to seal off the molten material and locating key way 21 to prevent the distribution spool from rotating.

The configurations of the distribution spools 6, 10a, 5, and 10 described in FIGS. 7–10 are typical for other distribution spools, whereby each distribution spool has its individual circumferential in-line 18 and off-line 19 flow passages connecting with individual transfer reservoirs, other distribution spools, or individual mold cavity assemblies.

It will be understood by those skilled in the art that each of the elements described above, or two or more together, may also find a useful application in alternate methods of producing preforms differing from the methods described herein.

While the invention has been described in detail in the foregoing specification as embodied in the context of a method for the production of preforms in a variety of molding apparatuses, it will be appreciated that the description is not intended to be limited to the details shown and various modifications and structural changes may be made without departing from the spirit and scope of the invention.

What is claimed is:

1. A method for forming hollow articles by introducing molten material into a plurality of mold cavities having in each case a slidable outside wall-forming sleeve forming an outside configuration of a hollow article and a fixed-position core pin forming an inside configuration of the hollow article, which comprises the steps of
   (a) introducing a molten material into a transfer reservoir consisting of a movable transfer housing and stationary displacement plug;
   (b) displacing a molten material into a slidable cavity bottom of said slidable outside wall-forming sleeve when in a retracting motion relative to the fixed position core pin;
   (c) retracting the slidable outside-wall-forming sleeve and the slidable cavity bottom in a continuous motion together with a preform mold manifold system to enlarge the cross-section between the outside configuration of a mold cavity of the plurality of mold cavities and the fixed-position core pin to facilitate the filling of said mold cavities with molten material at low pressure;
   (d) shifting a secondary distribution spool within a preform mold manifold block up to a land area of the secondary distribution spool to close off molten material in the mold cavity from the circumferential melt flow passages;
   (e) approaching the slidable cavity bottom together with the slidable outside-wall-forming sleeve towards the fixed-position core pin to condense the molten material concentrically within the mold cavity and around the fixed-position core pin, thereby forming the final configuration of the hollow article.

2. A method in accordance with claim 1 further comprising retracting the slidable outside wall-forming sleeve away from the core pin carrying the hollow article.

3. A method of producing hollow articles in a mold having a plurality of mold cavities comprising outside-wall-forming sleeves connected to mold cavity bottoms having orifice openings for passage of molten material which comprises positioning core pins with a smaller diameter in a fixed position in mold cavities while the mold cavities, mounted onto a manifold block, are positioned to reciprocate towards and away from and towards again said core pins in the fixed position, respectively, comprising the steps of
   (a) positioning said mold cavities around said orifice openings, and laterally shifting distribution spools within the manifold block which is in remote contact with the molds;
   (b) aligning circumferential melt flow passages, within the distribution spools, and transferring molten material into the mold cavities,
   (c) simultaneously retracting the mold cavity bottoms and outside-wall-forming sleeves in a programmed movement as the molten material continues to be transferred into the mold at low pressure; and
   (d) shifting the distribution spools located within the manifold block to shut off the cavity bottoms upon completion of the melt transfer phase and removing the desired hollow article.

4. A method in accordance with claim 3 further comprising the step of moving the manifold block together with the cavity bottoms in a shut-off state and outside-wall-forming sleeves toward the core pins in the fixed position to condense the molten material and to hold the same molten material under pressure until the shrinkage phase has been completed and the hollow articles are solidified to their final accurate dimensions.

5. A method in accordance with claim 3 further comprising the steps of
   (a) approaching simultaneously the manifold block with built-in mobile transfer housings toward stationary displacement plugs displacing the molten material into the mold cavities;
   (b) indirectly monitoring the molten material flow in passing compensation rods located in interconnecting melt flow passages prior to entering the molten material into the built-in mobile transfer housings;
   (c) transferring molten material from the built-in mobile transfer housings into mold cavities which are expanded to mold finished products after being transferred; wherein the built-in mobile transfer housings together with the stationary displacement plugs are a primary transfer means of molten material; and wherein the opening and closing of the interconnecting melt flow passages is a linear movement.

6. A method in accordance with claim 3 further comprising the steps of
   (a) retracting the mold cavities in a molding machine;
   (b) indexing the hollow articles in a vertical plane outside a molding machine clamp area,
   (c) passing the hollow articles through one or more cooling stations; and
   (d) indexing the hollow articles to an ejection station.

7. A method in accordance with claim 3 further comprising the steps of
   (a) retracting the mold cavities in a molding machine;
   (b) rotating the hollow articles in a horizontal plane outside a molding machine clamp area,
   (c) passing the hollow articles from a condensing station through one or more cooling stations; and
   (d) indexing the hollow articles to an ejection station.

8. A method in accordance with claim 3 further comprising the step of
   (a) retracting the mold cavities;
   (b) shuttling the hollow articles in a lateral plane, thereby freeing the circumferential melt flow passages to the core pins; and
   (c) passing the hollow articles to an ejection station.

9. A method in accordance with claim 3 further comprising the steps of
   (a) interconnecting the distribution spools;
   (b) laterally shifting the interconnected distribution spools to open and close the circumferential melt flow passages; and
   (c) conveying molten material from interconnecting melt flow passages to said circumferential melt flow passages.

10. A method in accordance with claim 3 further comprising the steps of
    (a) positioning the distribution spools close to a surface of the manifold block, thereby eliminating any intermediate transfer nozzles or bushings; and
    (b) opening and closing the respective orifice openings of the mold cavity bottoms with their respective land areas of the distribution spools, thereby eliminating individual mold cavity nozzles, bushings, or shut-off valves.

11. A method in accordance with claim 3 further comprising the steps of
    (a) conveying the molten material to built-in mobile transfer reservoirs housings in a molding machine from a plasticizing unit during reciprocating movement of the manifold block; and (b) conveying the molten material through a telescoping nozzle.

12. A method in accordance with claim 3 further comprising the steps of (a) engaging a telescoping nozzle at the entry of the manifold block; and (b) conveying the molten material from a plasticizer into built-in mobile transfer housings during reciprocating movement of the manifold block.

13. A method in accordance with claim 3 further comprising interconnecting the distribution spools, transferring molten material from a plasticizing unit into built-in mobile transfer housings via the interconnected distribution spools, so causing the circumferential melt flow passages of the distribution spools to intersect directly with the orifice openings in the mold cavity bottoms and flow paths from separate sources and block flow paths with lands of the distribution spool.

14. A method in accordance with claim 3 further comprising consecutively transferring molten materials from built-in mobile transfer reservoirs housings via the distribution spools, so causing the circumferential melt flow passages of the distribution spools to intersect directly with ports in the mold cavity bottoms and ports within the manifold block.

15. A method in accordance with claim 3 further comprising laterally shifting the distribution spools, so causing molten material to be conveyed to the mold cavities originating from a separate source.

16. A method in accordance with claim 3 further comprising the steps of (a) laterally shifting the distribution spools; and (b) blocking molten material from the mold cavities originating from a separate source.

17. A method in accordance with claim 3 wherein interconnecting and blocking ports lead indirectly to the mold cavities, to the built-in mobile transfer housings, and a plasticizing unit, where said circumferential melt flow passages are located in the distribution spools in a multitude of patterns and lengths.

18. A method in accordance with claim 3 further comprising the step of longitudinally shifting the distribution spools by means of external controls.

19. A method in accordance with claim 3 further comprising transferring the hollow articles on the core pins to alternating ejection stations in a horizontal shuttle motion at a molding machine clamp area.

20. A method in accordance with claim 3 further comprising transferring molten material from a multitude of built-in mobile transfer housings into a lesser number of mold cavities.

* * * * *